United States Patent
Mason, Jr. et al.

(10) Patent No.: US 6,961,226 B2
(45) Date of Patent: Nov. 1, 2005

(54) METHOD AND SYSTEM FOR PROVIDING POWER TO CIRCUIT BREAKERS

(75) Inventors: Henry Hall Mason, Jr., Farmington, CT (US); Craig Benjamin Williams, Avon, CT (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/291,492

(22) Filed: Nov. 12, 2002

(65) Prior Publication Data

US 2004/0090723 A1 May 13, 2004

(51) Int. Cl.[7] .................................................. H02H 3/16
(52) U.S. Cl. ........................................................ 361/42
(58) Field of Search .............................. 361/42, 46, 47

(56) References Cited

U.S. PATENT DOCUMENTS

| | | | | |
|---|---|---|---|---|
| 4,279,007 A | * | 7/1981 | Shimp ........................ 361/47 |
| 4,428,019 A | * | 1/1984 | Howell ........................ 361/45 |
| 4,513,268 A | | 4/1985 | Seymour et al. ............. 335/35 |
| 4,589,050 A | * | 5/1986 | Cutler et al. ................. 361/86 |
| 4,641,217 A | | 2/1987 | Morris et al. ................ 361/45 |
| 4,667,263 A | * | 5/1987 | Morris et al. ................ 361/42 |
| 4,698,655 A | * | 10/1987 | Schultz ...................... 257/108 |
| 4,786,885 A | * | 11/1988 | Morris et al. ............... 335/202 |
| 4,853,819 A | | 8/1989 | Suwa et al. .................. 361/47 |
| 5,510,945 A | | 4/1996 | Taylor et al. ................ 361/45 |
| 5,818,671 A | | 10/1998 | Seymour et al. ............. 361/42 |
| 5,835,322 A | * | 11/1998 | Smith et al. ................. 361/45 |
| 5,889,643 A | | 3/1999 | Elms .......................... 361/42 |
| 5,963,406 A | * | 10/1999 | Neiger et al. ................ 361/42 |
| 6,141,197 A | | 10/2000 | Kim et al. ................... 361/93 |
| 6,381,113 B1 | * | 4/2002 | Legatti ....................... 361/46 |

OTHER PUBLICATIONS

R. Boylestad, L. Nashelsky, Electronic Devices and Circuit Theory, 1987, Prentice–Hall, Inc, 4th edition, pp. 692–694.*

Boylestad et al., Electronic Devices and Circuit Theory, 1987, Prentice–Hall, 4th edition, pp. 692–694.

* cited by examiner

*Primary Examiner*—Brian Sircus
*Assistant Examiner*—Zeev Kitov
(74) *Attorney, Agent, or Firm*—Allan O. Maki; Foster, Swift, Collins & Smith, P.C.

(57) ABSTRACT

A method and system to improve efficiency and performance of a power supply by providing a consistent voltage level into a multiple-pole circuit breaker (10) to improve efficiency, reduce heat generation and increase the speed and consistency of "turn-on" times. A power supply (14) for changing waveform comprises circuitry for receiving at least one waveform having first and second components. Circuitry is provided for changing the first component and means for outputting a waveform comprising the outputs from the changing circuitry are also provided.

10 Claims, 4 Drawing Sheets

METHOD AND SYSTEM FOR PROVIDING POWER TO CIRCUIT BREAKERS

BACKGROUND OF THE INVENTION

The present invention relates generally to a method and system to improve efficiency and performance of a power supply and more particularly to a method and system to provide a consistent voltage level into a multiple-pole circuit breaker.

Circuit breakers to protect residential environments are generally known in the art and are mandated by electrical codes. Ground fault protection to residential circuit breakers is also known in the art, as well as arcing fault circuit interrupters. Arcing fault circuit interrupters are utilized in power distribution systems to "trip" a circuit in the presence of an arc fault-type current flow. For example, an arc fault condition exists when an electrical arc forms between the current-carrying phases and neutral phase above a designated threshold specified in electrical codes.

Circuit breakers having ground fault and arc fault circuit interrupting functions rely on electronic trip units, and an internal power supply is typically used to provide power thereto.

The electrical codes provide a limit for a maximum time interval after power-up of fault circuit interrupters, for which the trip unit must actuate in response to a fault condition. This time interval, including power supply charging time, is typically no more than 25 milliseconds. Charging the power supply typically consumes a large percentage of this time interval, which requires the power turn-on time to be fairly rapid. But rapid charging of the power supply, combined with high resistance levels in the circuit, can generate a significant amount of unwanted heat in the circuit. Thus, it is desirable for the internal power supply to power up the electronic trip unit as rapidly as possible, while at the same time reduce the steady state heat generation within the power supply that results after the rapid power-up.

A trip unit power supply within a circuit breaker can typically derive power either directly from the power line for which the circuit breaker is configured to protect, or indirectly from current transformers around the power line. It is advantageous to maintain consistent power to the trip unit, irrespective of current flow through the power line. Since transformers generate electrical potential only during current flow, they are ineffective in providing the consistent power to the trip unit power supply that is desired. Hence, trip unit power supplies for circuit breakers are typically powered directly from the power line voltage.

Existing power supplies for circuit breakers do not address the need described above related to fast power up capability while at the same time avoiding generation of excessive heat within the circuit. In addition, because of the advantages of having a consistently powered circuit breaker, they should not be powered from current transformers for the previously mentioned reasons. It would therefore be beneficial to power the circuit breakers directly from the power line for which they are protecting. Thus, there is a need to have a power supply that powers the trip unit of a circuit breaker consistently, reduces the amount of heat generated within the circuit, and increases speed and consistency of circuit "turn-on" (or power-up) times.

BRIEF DESCRIPTION OF THE INVENTION

Accordingly, an embodiment of the present invention provides a method and system to improve efficiency and performance of a power supply and more particularly to a method and system to provide a consistent voltage level into a multiple-pole circuit breaker that reduces the amount of heat generated and increases the speed and consistency of "turn-on" times.

In one embodiment of the present invention a power supply for changing waveforms includes circuitry for receiving at least one waveform having first and second components. Circuitry is provided for changing the voltage of the first component. Means for outputting a waveform comprising the outputs from the voltage changing circuitry are also provided.

In another embodiment of the present invention a power supply for converting alternating current to direct current comprises at least one first terminal, at least one neutral point, at least one second terminal, at least one grounding point, and a plurality of diodes configured between the at least one first terminal, the at least one neutral point, the at least one second terminal, and the at least one grounding point. A voltage regulator has an input, a first output, and a second output. The input and first output are connected in series with at least one of the plurality of diodes. The second output is connected to at least one of the at least one first terminal, the at least one neutral point, the at least one second terminal, and the at least one grounding point.

In another embodiment of the present invention a power supply bridge for converting alternating current to direct current comprises at least one first terminal for receiving at least one alternating current waveform, a neutral point, a grounding point, and at least one second terminal. The second terminal has its voltage measured with respect to the grounding point. At least one first diode is arranged to conduct current from the at least one first terminal, and at least one second diode is arranged to conduct current from the grounding point to the at least one first terminal. A third diode is arranged to conduct current from the neutral point to the at least one second terminal and a fourth diode is arranged to conduct current from the grounding point to the neutral point. A voltage regulator is arranged to receive current from the first diode and to output current to the at least one second terminal when the voltage of the alternating current waveform is less than a selected value. The voltage regulator is also arranged to output current to the grounding point when the voltage of the at least one alternating current waveform is greater than a selected threshold value.

In another embodiment of the present invention a circuit breaker comprises an enclosure, at least one pair of contacts within the enclosure, an operating mechanism within the enclosure, and a trip unit within the enclosure. The trip unit comprises a power supply comprising at least one first terminal, at least one neutral point, at least one second terminal, at least one grounding point, and a plurality of diodes configured between the at least one first terminal, the at least one neutral point, the at least one second terminal, and the at least one grounding point. A voltage regulator has an input, a first output, and a second output. The input and the first output are connected in series with at least one of the plurality of diodes, and the second output is connected to at least one of the at least one first terminal, the at least one neutral point, the at least one second terminal, and the at least one grounding point.

In another embodiment of the present invention a method for converting alternating current to direct current comprises receiving at least one waveform having first and second components; limiting the voltage of the first components; rectifying the second components; and outputting the changed first component combined with the rectified second component.

In another embodiment of the present invention a method for converting alternating current to direct current comprises receiving a plurality of waveforms having first and second components; reducing the voltage of the second components below a selected value; rectifying the first components such that the polarity is the same as that of the second component; and outputting the second component combined with the rectified first component.

In another embodiment of the present invention a ground fault circuit interrupter for interrupting a circuit in the event of a ground fault condition comprises at least one pair of contacts to connect the circuit interrupter to the circuit, an operating mechanism for interrupting flow of electrical current through the interrupter upon occurrence of a ground fault condition within the circuit, and a power supply for providing power to the circuit interrupter. The power supply comprises sensing circuitry for electronically limiting one half of a full wave bridge rectifier when more than one pole is powered. Thus substantially equal voltage is provided to the power supply, regardless of the number of poles powered.

In another embodiment of the present invention a system for converting alternating current to direct current comprises at least one waveform input point, at least one neutral point, at least one waveform output point, at least one grounding point, a plurality of diodes configured between the at least one waveform input point, the at least one neutral point, the at least one waveform output point, and the at least one grounding point. A voltage regulator having an input connected to at least one of the plurality of diodes is connected to the at least one waveform input point. A first output is connected to the at least one waveform output point, and a second output is connected to the at least one grounding point.

Other features of the present invention will become more apparent to persons having ordinary skill in the art to which the present invention pertains from the following description and claims taken in conjunction with the accompanying figures.

BRIEF DESCRIPTION OF THE FIGURES

The foregoing advantages and features, as well as other advantages and features will become apparent with reference to the description and figures below, in which like numerals represent like elements and in which.

DETAILED DESCRIPTION OF THE INVENTION

The present invention relates generally to a method and system to improve efficiency and performance of a power supply and more particularly to a method and system to provide a consistent voltage level into a multiple-pole circuit breaker. A power supply for a circuit breaker typically has a steady state operation and dissipates a certain amount of energy to maintain a selected power or voltage output. In some schemes, where low power is used, there is a resulting slower start-up time. In certain applications where a fast power-up is needed a higher steady state of power is also correspondingly created. However, this usually results in an undesirable higher energy use. The present invention solves these tradeoff problems by providing a low steady state power combined with a fast start-up time by placing a linear regulator within a 6-diode rectification scheme. Without the 6-diode rectification configuration, only a half wave rectification would be possible when only one pole is available and a resulting slower start up. The 6-diode configuration provides full wave rectification when one or more poles are available. The full wave rectification inverts the negative components of an AC sine wave to positive, therefore resulting in two positives for each cycle of the sine wave. With a one-pole circuit breaker, you can achieve full wave rectification and with a two-pole system there is a full wave rectification and double voltage.

This configuration allows residential AFCI and GFCI circuit breakers to be powered from line voltage, without first using a current transformer (CT). This allows the circuit breakers to be powered even if the load is turned off and there is no current flow. Residential AFCI and GFCI circuit breakers are required to monitor for faults regardless of load current. To do this the circuitry must be powered whenever one or more poles are available. A CT can only transmit current when a current (load) flows through it. Therefore, a CT powered scheme will not be able to monitor for faults regardless of load current. A GFCI can detect as little as a 5 mAmp difference between what is going in and out of the line. If the difference is greater than 5 mAmp, a fault will be detected. The fault threshold can also be set so that a greater loss in amperage, results in reduced time to trip the circuit.

Figure 1:
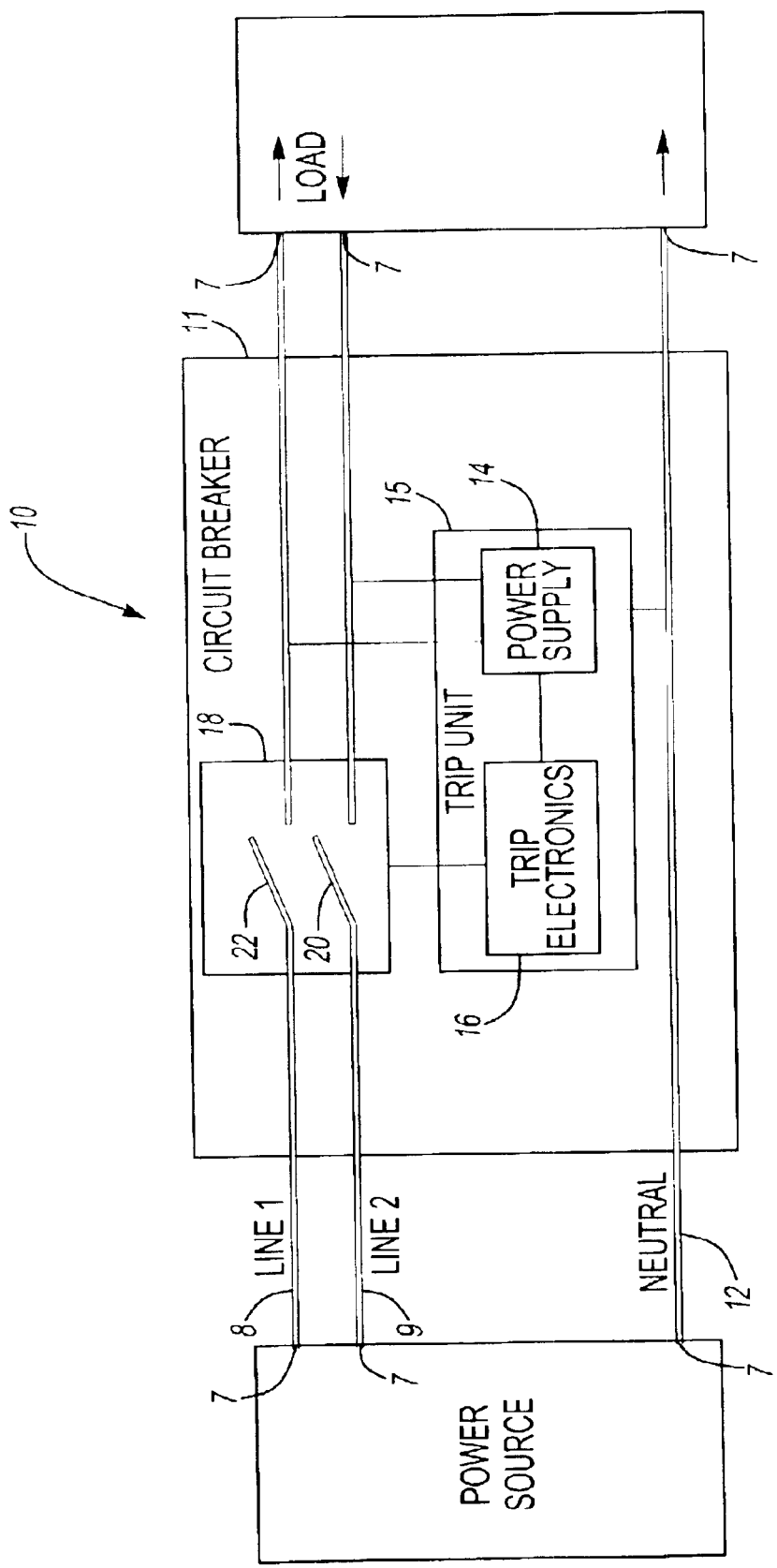
FIG. 1 illustrates a circuit breaker in accordance with one embodiment of the present invention.

Referring to FIG. 1, a circuit breaker 10 is provided with terminals 7 connected to conductor lines 8, 9 and 12 for receiving alternating current (AC) consisting of waveforms having alternating positive and negative components. In FIG. 1 the conductor line 12 is a neutral or ground wire. The circuit breaker 10 is contained within an enclosure 11 that is preferably a molded plastic housing. Circuit breaker 10 includes a trip unit 15 having a power supply 14 connected to lines 8 and 9 (commonly referred to as "poles") and neutral 12. Power supply 14 provides power to an electronic trip mechanism 16 also within trip unit 15. Trip mechanism 16 is configured to detect the occurrence of a ground fault or an arc fault (also referred to as an over-current) in the circuit breaker to which it is connected. Upon detection of such an event, trip mechanism 16 causes separation of contacts 20 and 22 within contact operating mechanism 18 thereby interrupting the fault current and protecting against the adverse effects of the fault. Therefore, the circuit breaker 10 interrupting functions are provided by the electronic trip mechanism 16.

The power supply 14 is limited by electrical codes to a maximum amount of time after power up of arc or ground fault circuit detection in which the contact operating mechanism 18 must be tripped. This time interval includes power supply charging time and is typically no more than 25 milliseconds. Charging of the power supply 14 typically consumes a large percentage of this time interval leaving only a very small interval of time for power up. However, the method to achieve rapid power-up can result in increased steady state heat generation in the circuit. Therefore, the need for rapid power up of the internal power supply 14 can conflict with the need to reduce heat generation associated with steady state operation after rapid power up. The present invention solves this conflict by limiting the DC voltage through a transistor to prevent excessive heat generation.

Figure 2:
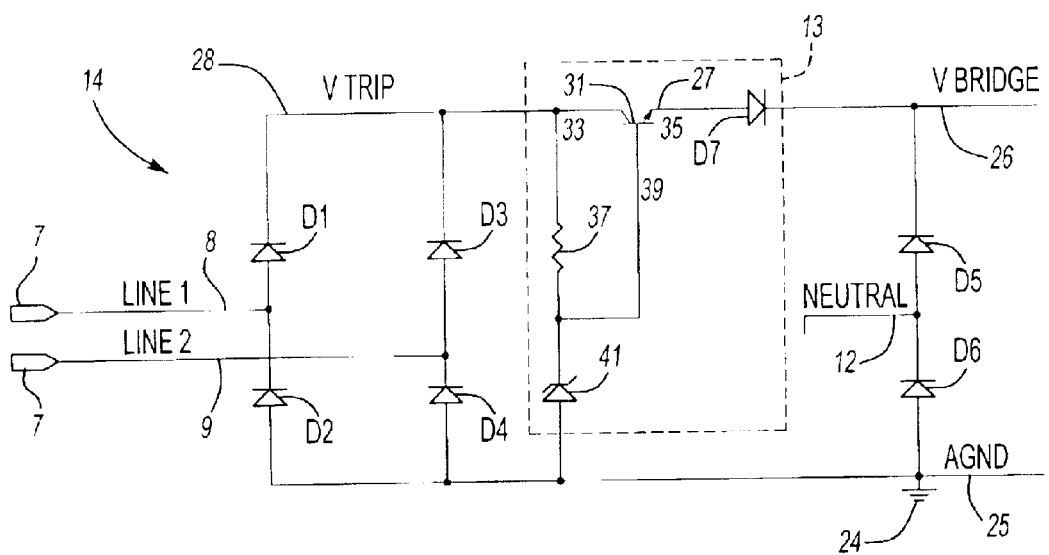
FIG. 2 illustrates a schematic of a power supply bridge circuit in accordance with the present invention.

Referring to FIG. 2 a schematic of the power supply 14 is illustrated and is referred to as a bridge or rectifying circuit. The power supply 14 includes a 6-diode configuration shown as D1–D6. Alternating current (AC) line voltage often needs to be converted in order to power direct current (DC) trip units. Converting alternating current to direct current requires the use of a rectifier. Rectifiers are typically formed from semiconductor devices such as diodes or transistors. Alternating current comprises a waveform having alternating positive and negative components. A half-wave rectifying bridge blocks the negative components of a waveform, resulting in a waveform having only positive components and a half-cycle duration. A full-wave rectifying bridge causes the positive components of a waveform to pass through the bridge unaffected and the negative components to be inverted into positive components. Hence, the output of a bridge is a DC waveform having only positive voltage. In general, the practice of passing current through a bridge changes the voltage polarity and is known as rectifying.

In FIG. 2, a pair of diodes is associated with a given line. For instance, line 18 connects to diodes D1 and D2, line 29 connects to diodes D3 and D4, and neutral line 12 is connected to diode pair D5 and D6. Additional lines would each add an additional pair of diodes in the circuit in a path similar to D3 and D4. The present invention provides a consistent voltage level into a multiple-pole (or multi-line) breaker power supply, irrespective of the number of poles (or lines) powered (where each pole provides one waveform). A linear voltage regulator 13 is provided and can have an input (V-Trip) 28, a first output (V-Bridge) 26, and a second output (AGND) 25. The V-Trip 28 and V-Bridge 26 are each connected "in series" with at least one of the diodes. Second output 25 is connected to lines 8 and 9, neutral wire 12 and a grounding point 24, via diodes D2, D4 and D6 as shown in FIG. 2. In the illustrated embodiment, a transistor 31 has a collector 33 connected to V-Trip 28 and an emitter 35 connected to V-Bridge 26. A resistor 37 has a first end connected to V-Trip 28 and a second end connected to a base 39 of transistor 31. A zener diode 41 has a first end connected to resistor 37 and a second end connected to second output 25. The transistor 31 impedes or changes the voltage and current to the V-bridge output 26 in the event that the voltage exceeds a threshold set by the zener diode 41. This threshold is typically adjustable between approximately line low and line low peak (102 and 145 volts).

In alternate embodiments, the zener diode can be replaced by other types of voltage reference devices such as a resistive voltage divider known in the art. By using the zener diode 41 to control the base voltage of transistor 31, output voltage 26 is limited because the base voltage determines voltage 27 at emitter 35. The zener diode 41 threshold or reference voltage is set below the peak voltage of a single pole (or line). Thus, if voltage between neutral line 12 exceeds VBRIDGE, current is provided through diode D5 and if VBRIDGE is above the zener diode 41 voltage threshold, the transistor 31 turns off. A diode D7 protects transistor 31 to ensure the voltage 27 of emitter 35 also does not exceed the base voltage of transistor 31. Generally, the base voltage in most circuit breakers is the reference voltage. The reference voltage is typically as high as possible to ensure rapid power up, but less than the peak voltage of a particular phase at low line to prevent too much power dissipation in the transistor. Otherwise, in a multiple-pole operation the transistor will never turn off and a large power dissipation will occur. A reference voltage of 102 VAC to 145 VAC (low line RMS to low line RMS*$\sqrt{2}$) would be typical for a one-pole voltage of 120 VAC. In addition, the linear voltage regulator 13 is typically used in conjunction with a diode bridge such as in the present invention. The linear regulator will turn off if the emitter voltage equals or exceeds the reference voltage. In one embodiment, the linear voltage regulator 13 could be included in one integrated circuit package. In other embodiments, the rectifier could consist of a silicon-controlled rectifier (SCR) instead of diodes as a means within the bridge to provide current limits to the V-bridge. The SCR could be a phase-fired SCR known in the art. In other alternate embodiments, other types of linear electronic devices such as MOSFET and IGBP transistors known in the art may be used to rectify the voltage.

Figure 3:
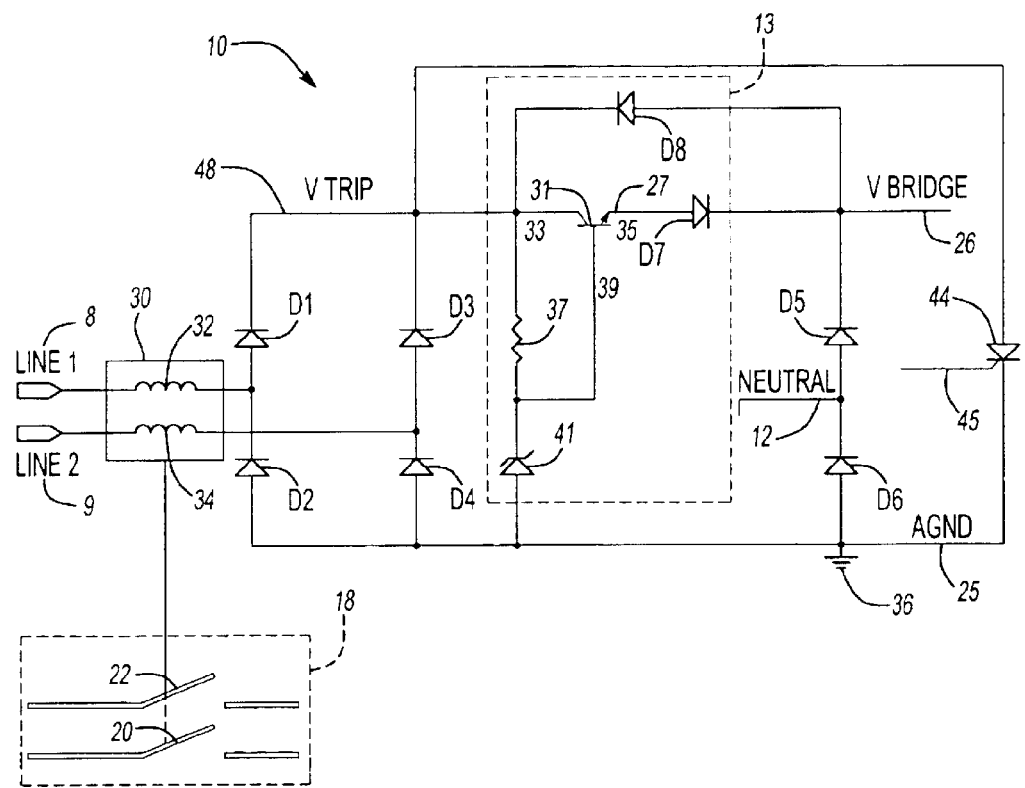
FIG. 3 illustrates a schematic of one embodiment of a circuit breaker of the present invention.

Referring to FIG. 3, a circuit breaker 10 in accordance with the present invention is illustrated which incorporates power supply 14. In this embodiment, a solenoid 30 contains two coils, 32 and 34, connected to line 8 and line 9, respectively, and represents a two-pole solenoid known in the art. A ground point 36 and neutral conductor line 12 are separated by a diode D6. A trip current is induced by activating a silicon-controlled rectifier (SCR) 44 which is positioned in the trip circuit before transistor 31. This position insures activation of an AFCI/GFCI circuit breaker, as the solenoid 30 requires more current than the transistor 31 will pass. Also, to insure activation of the solenoid 30 when powered by only a single pole, another diode, D8 can be added to provide a path for current to flow from neutral 12 through diode D5 through diode D8 to SCR 44 to AGND 25 and through D2 or D4 to the present pole.

In this embodiment of the present invention, the SCR 44 performs like a diode that can be turned on and off. SCR 44 is normally off (or open). An input voltage 45 from the trip unit 15 signals the SCR 44 to trip and SCR 44 then turns on and performs like a diode. Once turned on, the SCR 44 stays in the "on" state until the current flow stops, whereupon the SCR turns off. When the SCR 44 is turned on, a relatively large current will flow, which energizes solenoid 30 and triggers the mechanical trip mechanism 18.

Figure 4:
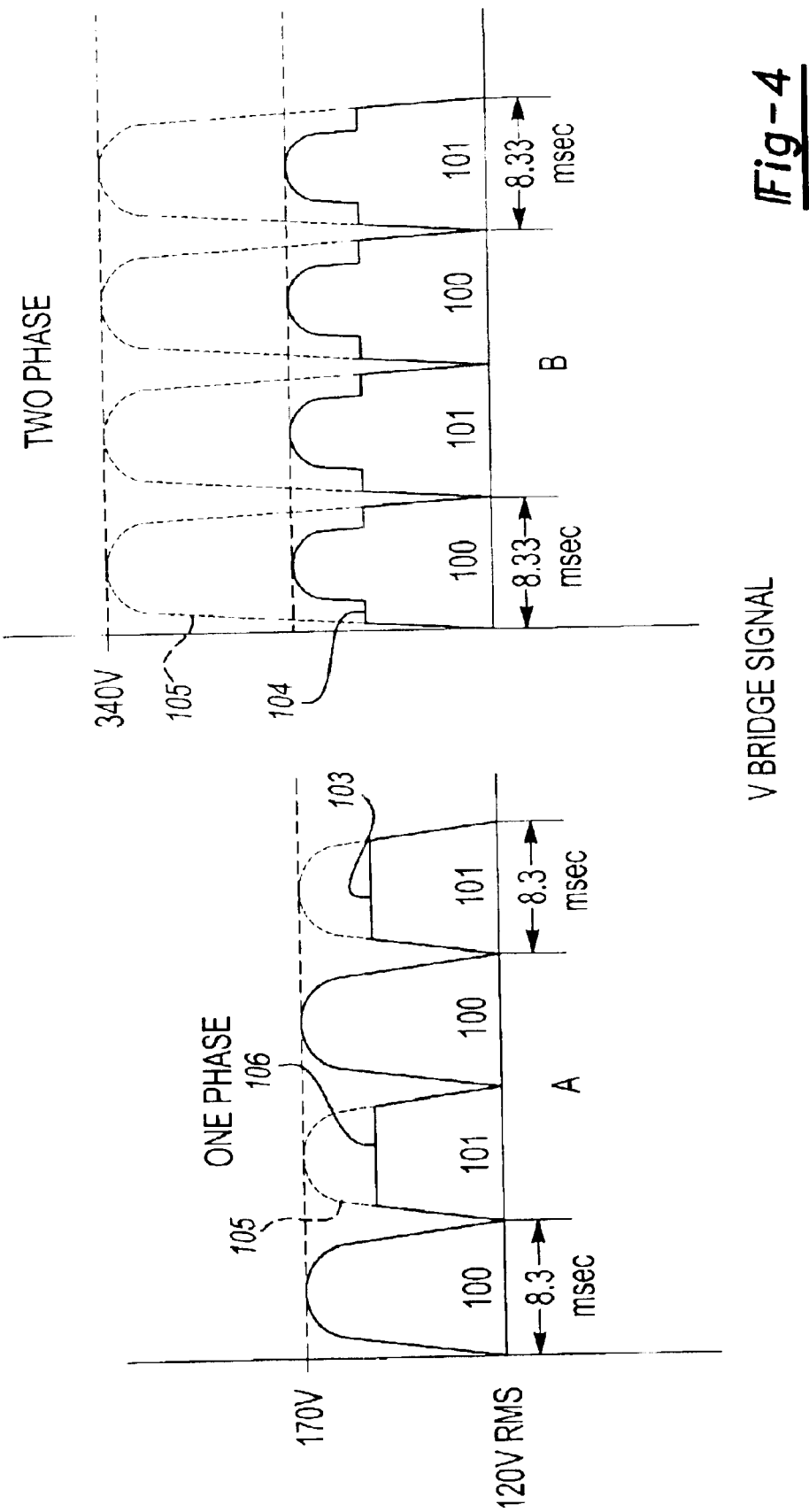
FIG. 4 illustrates a waveform schematic of the voltage output at the V-bridge in the embodiment of the present invention shown in FIG. 3.

FIG. 4 illustrates waveforms produced by "limiting" or "changing" the voltage with a bridge circuit. The waveform represents a 16.6 msec cycle waveform (with an 8.3 msec half cycle). In a one-phase configuration as shown in "A," only a single pole is powered, such as a 120 VAC line. Here the effects of the limiting in waveform "A" are shown at 106 (a non-limited waveform is indicated at 105 as a dashed line). During the half cycle of the alternating current wave that is positive (shown at 101), the V-Bridge 26 voltage (from FIG. 3) is powered from line voltage through transistor 31. As the V-Bridge 26 voltage reaches the reference voltage set by the zener diode 41, the transistor 31 turns off, thereby limiting the voltage as shown at 106. At 100, the negative half cycle of the wave, there is no limiting of the voltage. Here, the neutral line 40 is powering and is not being limited.

The horizontal component 104 in a two-phase configuration as shown in "B" is controlled by the adjustment of the zener diode 41. As the V-Bridge 42 voltage rises above the reference voltage, the transistor 31 turns off. This voltage level is illustrated within the waveform as horizontal lines 104. The neutral conductor line 40 is not limited, therefore, as the neutral voltage increases, the V-Bridge 42 voltage of the waveform rises slowly to the voltage peak of one pole (170V for the 120 VAC). During a two-pole operation, the reference voltage is set to be less than the peak low line voltage per pole (i.e., 290 VAC or 145 AC per pole). The transistor 31 turns off and the V-bridge 42 voltage is provided from neutral line 40.

In the present specification various parameters commonly used in the United States of America have been used for purposes of illustration. However, those skilled in the art will recognize that other values for these parameters may be substituted. The operation of devices and methods of this invention are cycle dependent, not frequency dependent. Voltages of 100 to 277 volts per pole are also sometimes used, and it will be understood that the present invention is adaptable for use with any such desired variations. Also, while the invention has been described in terms of various specific embodiments, those skilled in the art will recognize that the invention can be practiced with modification within the spirit and scope of the claims.

We claim:

1. A power supply for converting alternating current to direct current, said power supply comprising:
    at least one first terminal for receiving alternating current;
    at least one neutral point electrically neutral with respect to said at least one first terminal;
    at least one second terminal for outputting direct current;
    at least one grounding point serving as the electrical ground for said at least one second terminal;
    a bridge including plurality of diodes configured between said at least one first terminal, said at least one neutral point, said at least one second terminal, and said at least one grounding point to full-wave rectify said alternating current; and
    a voltage controlled switch for switching off a portion of said bridge in the event that a voltage threshold is exceeded, said switch having an input, a first output, and a second output, said input and said first output connected in series with at least one of said plurality of diodes, and said second output connected to at least one of said at least one first terminal, said at least one neutral point, said at least one second terminal, and said at least one grounding point, wherein said voltage controlled switch further comprises:
        a transistor having a collector connected to said input and an emitter connected to said first output;
        a resistor having a first end connected to said input and a second and connected to a base of said transistor; and
        a zener diode for adjusting said voltage threshold and having a first end connected to said resistor second end and said transistor base and a second end connected to said second output.

2. A power supply for converting alternating current to direct current, said power supply comprising:
    at least one first terminal for receiving alternating current;
    at least one neutral point electrically neutral with respect to said at least one first terminal;
    at least one second terminal for outputting direct current;
    at least one grounding point serving as the electrical ground for said at least one second terminal;
    a bridge including plurality of diodes configured between said at least one first terminal, said at least one neutral point, said at least one second terminal, and said at least one grounding point to full-wave rectify said alternating current; and
    a voltage controlled switch for switching off a portion of said bridge in the event that a voltage threshold is exceeded, said switch having an input, a first output, and a second output, said input and said first output connected in series with at least one of said plurality of diodes, and said second output connected to at least one of said at least one first terminal, said at least one neutral point, said at least one second terminal, and said at least one grounding point, wherein said voltage controlled switch further comprises:
        a transistor having a collector connected to said input and an emitter;
        a first diode having a first end connected to said emitter and a second end connected to said first output;
        a resistor having a first end connected to said input and a second end connected to a base of said transistor; and
        a zener diode having a first end connected to said resistor second end and said transistor base and a second end connected to said second output.

3. A power supply according to claim 1, wherein said voltage controlled switch is packaged within a single integrated circuit.

4. A power supply bridge for converting alternating current to direct current, said power supply bridge comprising:
    at least one first terminal for receiving at least one alternating current waveform;
    a neutral point electrically neutral with respect to said at least one first terminal;
    a grounding point;
    at least one second terminal for outputting direct current;
    a first diode arranged to conduct current from said at least one first terminal;
    a second diode arranged to conduct current from said grounding point to said at least one first terminal;
    a third diode arranged to conduct current from said neutral point to said at least one second terminal;
    a fourth diode arranged to conduct current from said grounding point to said neutral point; and
    a voltage controlled switch arranged to receive current from said first diode and to output current to said at least one second terminal when the voltage of said alternating current waveform is less than a selected value, said voltage controlled switch further arranged to output current to said grounding point when the voltage of said at least one alternating current waveform is greater than a selected threshold value.

5. A circuit breaker comprising:
    an enclosure;
    an operating mechanism within said enclosure including at least one pair of contacts;
    a trip unit within said enclosure connected to said operating mechanism and configured to connect to an electric circuit, said trip unit further configured to detect an overcurrent within said electric circuit and separate said at least one pair of contacts upon occurrence of said overcurrent, said trip unit including a power supply connected to said electric circuit for providing power to said trip unit, said power supply comprising at least one first terminal for receiving at least one waveform, at least one neutral point, at least one second terminal for outputting direct current, at least one grounding point serving as the electrical ground for said at least one second terminal, and a plurality of diodes configured to full-wave rectify waveforms input into said at least one first terminal; and
    a voltage controlled switch having an input, a first output, and a second output, said input and said first output connected in series with at least one of said plurality of diodes, and said second output connected to at least one of said at least one first terminal, said at least one neutral point, said at least one second terminal, and said at least one grounding point, wherein said voltage controlled switch further comprises:

a transistor having a collector connected to said input and an emitter connected to said first output;

a resistor having a first end connected to said input and a second end connected to a base of said transistor;

a zener diode having a first end connected to said resistor second end and said transistor base and a second end connected to said second output.

6. A circuit breaker comprising:

an enclosure;

an operating mechanism within said enclosure including at least one pair of contacts;

a trip unit within said enclosure connected to said operating mechanism and configured to connect to an electric circuit, said trip unit further configured to detect an overcurrent within said electric circuit and separate said at least one pair of contacts upon occurrence of said overcurrent, said trip unit including a power supply connected to said electric circuit for providing power to said trip unit, said power supply comprising at least one first terminal for receiving at least one waveform, at least one neutral point, at least one second terminal for outputting direct current, at least one grounding point serving as the electrical ground for said at least one second terminal, and a plurality of diodes configured to full-wave rectify waveforms input into said at least one first terminal; and a voltage controlled switch having an input, a first output, and a second output, said input and said first output connected in series with at least one of said plurality of diodes, and said second output connected to at least one of said at least one first terminal, said at least one neutral point, said at least one second terminal, and said at least one grounding point, wherein said voltage controlled switch comprises:

a transistor having a collector connected to said input and an emitter;

a first diode having a first end connected to said emitter and a second end connected to said first output;

a resistor having a first end connected to said input and a second end connected to a base of said transistor; and a zener diode having a first end connected to said resistor second end and said transistor base and a second end connected to said second output.

7. A circuit breaker according to claim 6, wherein said transistor comprises one of a MOSFET and IGBT transistor.

8. A circuit interrupter for interrupting a circuit in the event of a ground fault condition, comprising:

a trip mechanism configured to interrupt flow of electrical current through the circuit interrupter upon occurrence of a ground fault condition within the circuit;

a power supply for providing power to the trip mechanism, said power supply comprising circuitry for changing the components of an alternating current waveform input when more than one pole is supplied to the power supply, said power supply including a bridge formed by a plurality of diodes configured between a first terminal, a neutral point, a second terminal, and a grounding point to full-wave rectify said alternating current; and a voltage controlled switch for switching off a portion of said bridge in the event that a voltage threshold is exceeded, said switch having an input, a first output, end a second output, said input and said first output connected in series with at least one of said plurality of diodes, and said second output connected to at least one of said first terminal, said neutral point, said second terminal, and said ground point.

9. A circuit interrupter according to claim 8 further comprising a solenoid connected to said trip unit and a rectifier, said rectifier adapted to supply current to said solenoid to trigger said trip unit to interrupt said circuit.

10. A circuit interrupter according to claim 9, wherein said rectifier is a silicon controlled rectifier.

* * * * *